(12) United States Patent
Merten et al.

(10) Patent No.: US 7,775,342 B2
(45) Date of Patent: Aug. 17, 2010

(54) SCRAPERS FOR LINK CHAINS OF SCRAPER CHAIN CONVEYORS AND SCRAPER-SECURING ELEMENT THEREOF

(75) Inventors: Gerhard Merten, Lünen (DE); Hans Meya, Werne (DE)

(73) Assignee: Bucyrus DBT Europe GmbH, Lunen (DE)

( * ) Notice: Subject to any disclaimer, the term of this patent is extended or adjusted under 35 U.S.C. 154(b) by 120 days.

(21) Appl. No.: 12/225,265

(22) PCT Filed: Mar. 24, 2006

(86) PCT No.: PCT/EP2006/002735
§ 371 (c)(1),
(2), (4) Date: Sep. 24, 2008

(87) PCT Pub. No.: WO2007/110089
PCT Pub. Date: Oct. 4, 2007

(65) Prior Publication Data
US 2009/0266681 A1   Oct. 29, 2009

(51) Int. Cl.
*B65G 19/24*   (2006.01)
(52) U.S. Cl. .................... 198/731; 198/728
(58) Field of Classification Search ........... 198/731, 198/728, 733
See application file for complete search history.

(56) References Cited

U.S. PATENT DOCUMENTS

| | | | | |
|---|---|---|---|---|
| 4,989,724 | A | * | 2/1991 | Komotzki .................. 198/731 |
| 5,165,766 | A | * | 11/1992 | Thomas ..................... 305/191 |
| 5,931,283 | A | * | 8/1999 | Meya ........................ 198/731 |
| 6,595,351 | B2 | * | 7/2003 | Malitzki ..................... 198/731 |
| 7,159,707 | B2 | * | 1/2007 | Malitzki et al. ............. 198/731 |

FOREIGN PATENT DOCUMENTS

| | | |
|---|---|---|
| DE | 2031875 | 1/1972 |
| DE | 2160027 | 6/1973 |
| DE | 3307119 | 9/1984 |
| DE | 19701579 | 6/1998 |
| DE | 10225341 | 10/2003 |

OTHER PUBLICATIONS

International Search Report PCT/EP2006/002735; Filed Mar. 24, 2006.

* cited by examiner

*Primary Examiner*—Mark A Deuble
(74) *Attorney, Agent, or Firm*—Rankin, Hill & Clark LLP

(57) ABSTRACT

The invention relates to scrapers for link chains of in particular double center scraper chain conveyors, comprising a one-part scraper body with a head web connecting two lateral scraper wings and at least one insertion pocket for insertion of a horizontal chain link of the link chain and securing scraper by means of a detachable scraper-securing element. In order to improve the entrainment of scrapers connected to the horizontal chain links and to be able to use the scrapers even with novel link chains, grooves extend in insides of scraper wings and outsides of an intermediate web over the height of limb beds up to head web and form receivers for entrainment projections on the outer surfaces of limbs of horizontal chain links. The invention also relates to scraper-securing element.

28 Claims, 3 Drawing Sheets

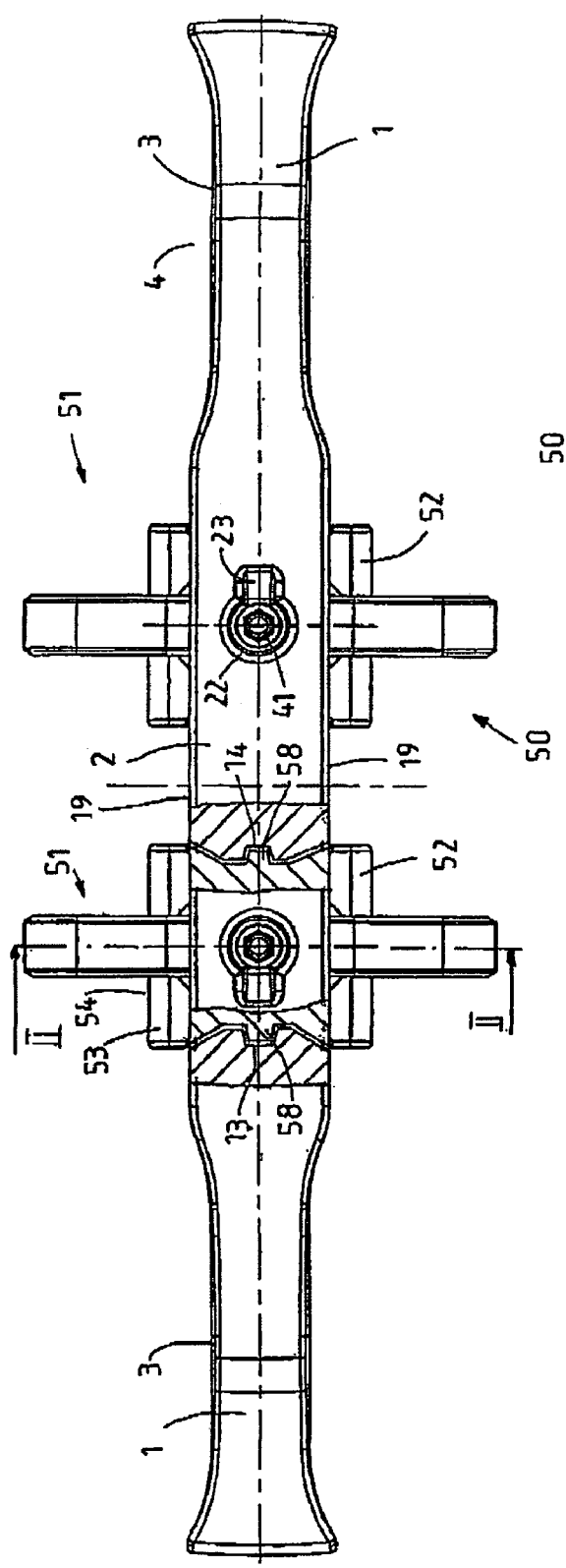
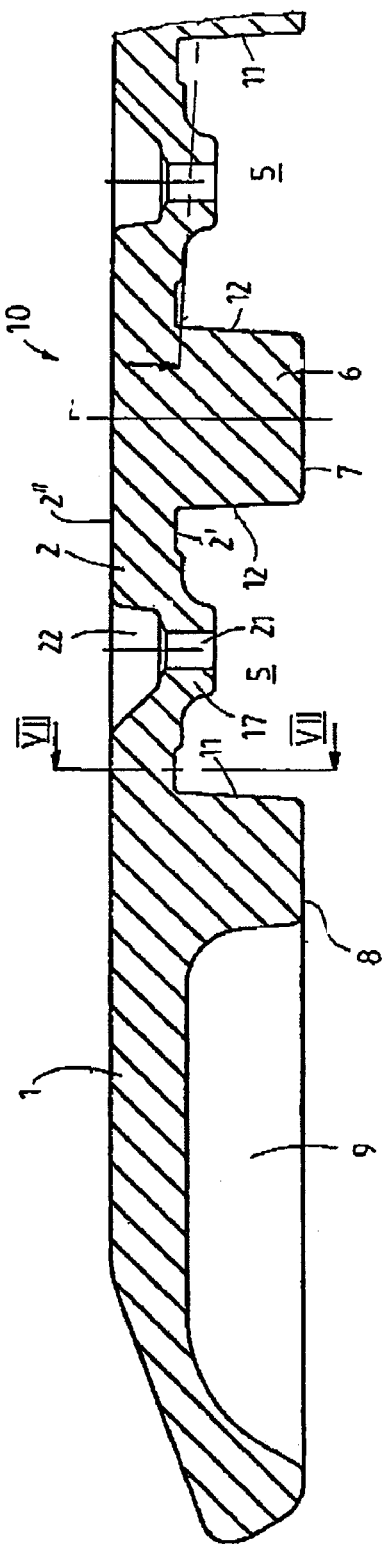
FIG 1
FIG 6

SCRAPERS FOR LINK CHAINS OF SCRAPER CHAIN CONVEYORS AND SCRAPER-SECURING ELEMENT THEREOF

This application claims priority from International Application PCT/EP2006/002735 filed on Mar. 24, 2006 which is hereby incorporated by reference herein in its entirety and which forms a part of the specification of this application. In addition, copending International Application PCT/EP2006/002734 filed on Mar. 24, 2006 is hereby incorporated by reference herein in its entirety and also forms a part of the specification of this application.

The invention relates to scrapers for link chains of scraper chain conveyors, in particular double center scraper chain conveyors, comprising a one-part scraper body with a head web connecting two lateral scraper wings and at least one insertion pocket between the scraper wings for insertion of a horizontal chain link of the link chain and securing the scraper on an inserted horizontal chain link by means of a detachable scraper-securing element which can be connected to the head web, wherein the insides facing one another of the scraper wings are provided below the head web with a groove, the head web has on both front sides bearing zones for the fronts of vertical chain links of the link chain and on its underside on both sides of the bearing zones a limb bed for limbs of the horizontal chain links of the link chain. The invention also relates to the scraper-securing element provided for these scrapers.

BACKGROUND OF THE INVENTION

A generic scraper is known from DE 102 25 341 C1. The known scraper can be fixed to link chains whose horizontal and vertical chain links in each case comprise oval ring eyelet members with round chain fronts. Fixing of the scraper on the horizontal chain links of these link chains is performed by means of a securing strap which runs in one piece between both insides of the scraper wings and clamps the horizontal chain links from below against the underside of the head web. The securing of the strap on the head web against detachment is performed by means of dowel pins which can be inserted into through bores, which dowel pins penetrate through the pins which are formed on the upper side of the strap and engage with corresponding locking recesses in the head web.

DE 197 01 579 A1 discloses a link chain whose front sections have straight front zones and whose vertical chain links have a wire cross-section which is constant around the full circumference and is provided on the outer periphery with a flat section. A link chain formed in this manner can also be used in high-performance scraper chain conveyors and the chain links are subject to less wear than those of a standard scraper chain with vertical and horizontal round wire chain links. The scrapers known from DE 197 01 579 A1 have, for connection to this link chain, a head web on whose underside a pin projects onto which a horizontal web chain link having a transverse web can be pushed and can be fixed by means of separate locking rails. In one particular configuration of scraper and horizontal chain link, the passages in the transverse webs can also be formed substantially T-shaped. This configuration enables a positive-locking closure of pin and transverse web, wherein the chain links can be mounted at the pins only in a defined swivel position. The scrapers provided in DE 197 01 579 A1 require special horizontal web chain links with transverse web and are also not suitable for withstanding the large forces which occur with a high-performance conveyor.

SUMMARY OF THE INVENTION

In accordance with the present invention, provided is a scraper for link chains of scraper chain conveyors and a scraper-securing element therefor.

A scraper for link chains of scraper chain conveyors, in particular double center scraper chain conveyors, scraper comprising a scraper body having a head web connecting two lateral scraper wings and at least one insertion pocket between scraper wings, pocking being shaped to receive an associated horizontal chain link of an associated link chain and securing scraper relative to associated horizontal chain link by means of a detachable scraper-securing element which is connectable to head web, wings including insides facing one another and inside being below head web, insides each including a groove, head web having front sides that include a bearing zone for the fronts of an associated vertical chain links of the associated link chain and on its underside and head we further including a limb bed on both sides of bearing zones for limbs of horizontal chain links and limb beds having a limb bed height, grooves extend over at least a portion of limb bed height up to head web and forming receivers for associated entrainment projections on the outer faces of the associated limbs of the associated horizontal chain links.

An object of the invention is to create a scraper in particular for a link chain with special chain links which has a sufficiently long lifetime and is reliably entrained even in the case of large width and thus high potential conveying power and with low wear by the horizontal chain links of a link chain.

These and further objects are achieved according to the invention in that the grooves in the insides of the scraper wings extend over the height of the limb beds up to the head web and form receivers for entrainment projections on the outer faces of the limbs of the horizontal chain links. The scrapers according to the invention are particularly suitable for a link chain which the applicant has developed together with the scrapers and which is the subject matter of a parallel application with the same filing date. In this link chain, entrainment projections which can cooperate with the receivers formed by the grooves on the scrapers by positive fit are formed on the outer surfaces of the limbs of the horizontal chain links in order, as a result, to move the scrapers evenly and well-supported in the conveying direction preferably in a pushing manner. In one embodiment, the grooves in the scraper wings extend on both sides of the limb beds up to the head web such that particularly reliable, even and also low-wear entrainment of the scrapers is achieved in the running direction of the link chain due to the engagement of the entrainment projections with the grooves in the scraper.

According to one aspect of the invention, the grooves in the insides extend up to the underside of the scraper wings. This not only enables precise placing and insertion of the horizontal chain links, but rather the grooves can, as is explained further below, also fix and hold a scraper-securing element by positive fit in the direction of movement.

The invention can in principle also be used in the case of scrapers for single center scraper chain conveyors in which only two grooves are formed in the insides of the scraper wings and a scraper-securing element extends between these two grooves in the insides of the scraper wings. However, the preferred configuration of the scrapers has an intermediate web located at the head web between both scraper wings, which intermediate web in each case delimits an insertion pocket at one side with its outsides which face the insides and also has in each case a groove in the outside, which groove extends over the height of the limb beds up to the head web and forms a receiver for an entrainment projection on the outer surface of the limbs of the horizontal chain links. A corresponding scraper then has two insertion pockets lying next to one another for horizontal chain links of the link chain strands lying next to one another of a double center chain. Each horizontal chain link inserted into an insertion pocket then engages with its entrainment projections at one side of the chain bed with a groove on the inside of one of the scraper wings and on the other side of the chain bed with a groove in the outside of the intermediate web.

According to another aspect of the invention, a scraper-securing element could then be provided which furthermore extends exclusively between both grooves in the insides and, as a one-part scraper-securing element, simultaneously secures both inserted horizontal chain links on the scraper against falling out. Nevertheless, this configuration provides that the grooves also reach in the outsides up to the underside of the central web, wherein the underside of the central web is then formed substantially flush with the undersides of the scraper wings in order to improve the bearing of the scrapers on the conveyor base of a conveyor. Two insertion pockets are therefore present, into which in each case a horizontal chain link with an associated scraper-securing element can be inserted and secured against falling out.

According to yet another aspect of the invention, the limb beds are formed for insertion of horizontal chain links which have straight front zones on the front sections and recesses provided with entrainment projections in the outer surfaces of the limbs connecting the front sections to one another. Moreover, the bearing zones are preferably formed at the head web of the scraper for supporting of vertical chain links of a link chain, whose wire cross-section is constant around the full circumference and is provided on the outside with a flat section and on the inside with a circular camber, wherein bevels are formed at the transition of the flat section to the circular arc. It is particularly advantageous for receiving of the horizontal chain links of a corresponding scraper link chain if the limb beds comprise surfaces which run out flat towards the insides of the scraper wings and/or the outsides of the intermediate web, on which surfaces the substantially rectangular horizontal chain links can then be particularly well supported.

In accordance with a further aspect of the invention, the fixing of the scraper-securing element on the scraper is by means of a fixing screw and a nut which cooperates therewith. To this end, it is advantageous if a screw passage for the shaft of the fixing screw and/or a recess for insertion of a nut which cooperates with the fixing screw is/are formed in the head web between both bearing zones. It is also advantageous if an introduction inclination for a detachment tool opens into each recess in order to be able to detach a potentially rusted-tight nut from the shaft of the fixing screw even after many hours of operation. In this case, the detachment or tightening of the nut can be performed from above and thus with easy access at all times in the upper trunk of a scraper chain conveyor, wherein possibly for mounting the scraper wings must only be pushed on from above onto the scraper-securing elements and the fixing screws and the screws must be tightened.

In accordance with yet a further aspect of the invention, it is advantageous for the cooperation of the scraper with the vertical chain links if the bearing zones preferably embodied as circular arc-shaped cambers also extend over the front sides of a projection protruding downward at the head web between the limb beds and/or are exclusively formed as recesses on the front sides. The preferably flattened outsides of the vertical chain links can then bear on this projection over a relatively large surface area, as a result of which a relatively large bearing face is achieved between the vertical chain links and the front sides of the scrapers and simultaneously a good angling capacity of the vertical chain links in the vertical direction is enabled. This vertical angling capacity is particularly necessary if the link chain with the connected scrapers runs around on a driven chain wheel. The projection is expediently provided centrally with the screw passage.

As already explained further above, it is advantageous if the scrapers have scraper-securing elements which can be inserted from below into the insertion pockets and have at their upper side limb beds for the limbs of the horizontal chain links and have at their transverse sides a projection which can be introduced into the grooves. The projection on the transverse sides of the scraper-securing element then secures this by positive locking in the grooves in the insides of the scraper wings or the outsides of the preferably present intermediate web, as a result of which the grooves are given a dual function, namely to bring about, on the one hand, a positive-locking closure between horizontal chain links and scrapers and, on the other hand, a positive-locking closure in the direction of travel of the link chain between the scraper-securing elements and the scrapers. Moreover, the projection can comprise a vertical web with a trapezoidal cross-section which correspondingly cooperates with grooves in the insides and outsides on the scraper which likewise have a trapezoidal cross-section and extend from a groove base to the surfaces of the insides or outsides on the scraper.

According to another aspect of the invention, the scraper-securing elements are provided in their base surface with a receiving recess for the screw head of a fixing screw. It is particularly expedient if the receiving recess forms a positive-locking anti-twist device for the screw head since then exclusively a mounting tool for the nut which can be screwed onto the shaft of the fixing screw must be placed from above without the fixing screw having to be fixed by a locknut. In order to tighten the nut, it is then sufficient to prevent a rotation of the scraper. The receiving recess can in particular be formed as a transverse slot which e.g. receives the screw head of a hammerhead screw as a fixing screw in a rotationally fixed manner.

According to yet even another aspect of the invention, the width of the scraper-securing means can correspond to the minimum distance of the bearing zones for the vertical chain links on the front zones of the head web. Furthermore, the scraper-securing element can preferably be provided centrally between both entrainment projections with a raised portion on the sides of which limb beds for the limbs of the horizontal chain links are formed. The raised portion and/or the projection can be provided laterally with rounded portions for cooperation with the limbs of the chain links of the link chain, wherein the rounded portions then can run out flat towards the outside or inside. The raised portion and/or the projection can, in the case of the horizontal chain links according to the invention, enclose in inner eyelets of these chain links and lie on top of one another there in the mounting status of scrapers, horizontal chain link and scraper-securing element.

The invention also relates to a scraper-securing element for securing a scraper on horizontal chain links of a link chain of a double center scraper chain conveyor which are inserted into insertion pockets on the scraper, wherein the base of the scraper-securing element is provided on its transverse sides with projections for engagement with grooves in the inside of the scraper wings and the outside of an intermediate web on the head web of a scraper.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 1 shows a top view, partially sectioned, of a scraper connected to a link strand of a double center chain;

FIG. 6 shows a longitudinal section through a scraper according to the invention, partially broken up;

DETAILED DESCRIPTION OF THE INVENTION

Figure 2:
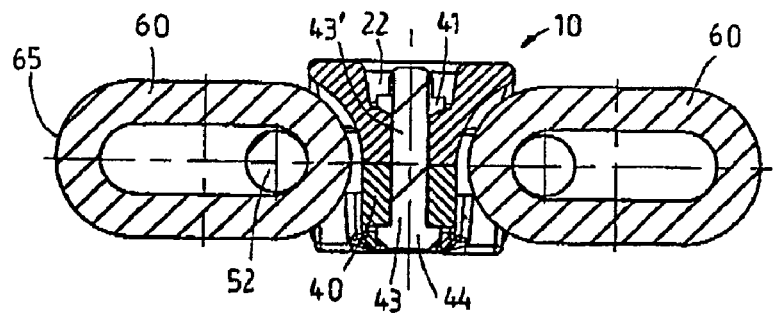
FIG. 2 shows a sectional view along II-II in FIG. 1.

Referring now to the drawings wherein the showings are for the purpose of illustrating preferred and alternative embodiments of the invention only and not for the purpose of limiting same, the scraper generally designated in the figures by 10 is formed for a relatively wide underground high-performance scraper chain conveyor in which a link chain 50 embodied as a double center chain rotates with two link chain strands 51 formed identically to one another for conveying the extraction material, in particular coal. In this case, scrapers 10 according to the invention are in each case connected at a distance from one another to horizontal chain links 52 which have chain fronts 53 with a straight front side 54 as is already easily apparent from FIG. 1.

Figure 8:
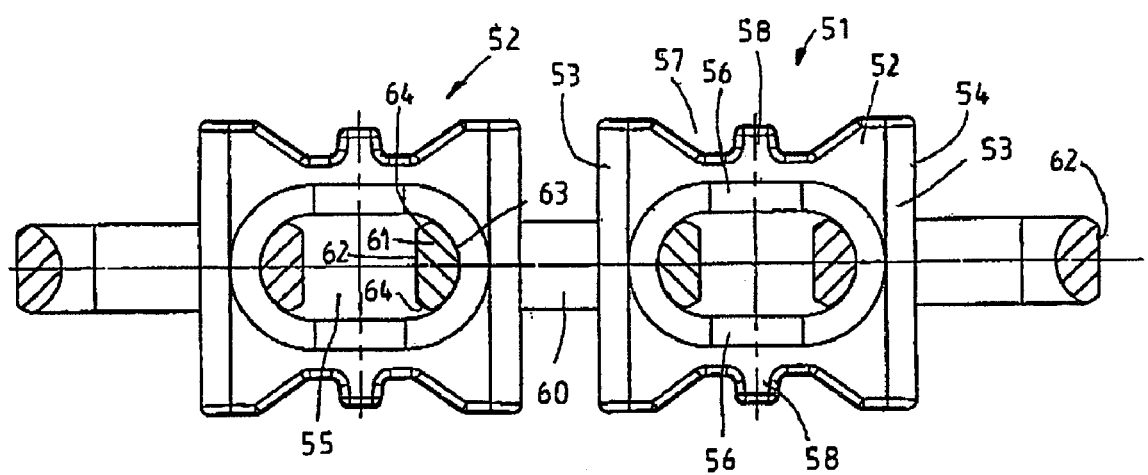
FIG. 8 shows a chain strand of a link chain in which the scrapers according to the invention are preferably used.

Link chain 51 without mounted scrapers is shown in a top view in FIG. 8 to which reference is made first. In each case two horizontal chain links 52 formed identically to one another with front parts 53 having straight front sides 54 are connected to one another by means of a vertical chain link 60, which vertical chain link 60 has a constant cross-sectional profile 61 around the full circumference. Cross-sectional profile 61 of vertical chain links 60 is, around the full circumference, provided on its outside with a flat section 62 and embodied on its inside facing an inner opening with a circular arc-shaped camber 63. Flat section 62 of cross-sectional profile 61 forms a transition in each case via bevels 64 into circular arc-shaped camber 63 and vertical chain links 60 which are generally relatively small engage with inner openings 55 of horizontal chain links 52. All horizontal chain links 52 have limbs 56 which connect front sections 53 embodied in a rectangular shape on the front side to one another, and limbs 56 are provided on their outside with a recess 57 in which, centrally between both front sections 53, an entrainment projection 58 protruding into recess 57 is formed with a trapezoidal cross-sectional profile which serves for improved scraper connection by positive-locking entrainment of the scrapers. Link chain 51 with approximately rectangular horizontal chain links 52 and flat vertical chain links 60 is particularly suitable for high-performance scraper chain conveyors since, on the one hand, horizontal chain links 52, during rotation around a chain wheel, are only subject to low surface pressures with the pockets of the chain wheel and, on the other hand, the articulated play between vertical chain links 60 and horizontal chain links 52 is also improved in particular by bevels 64, as a result of which the overall wear characteristics of link chain 51 are minimized. The scraper chain shown in FIG. 8 forms the subject matter of a separate application with the same filing date, to which disclosure reference is made for completion of the present disclosure.

Figure 3:
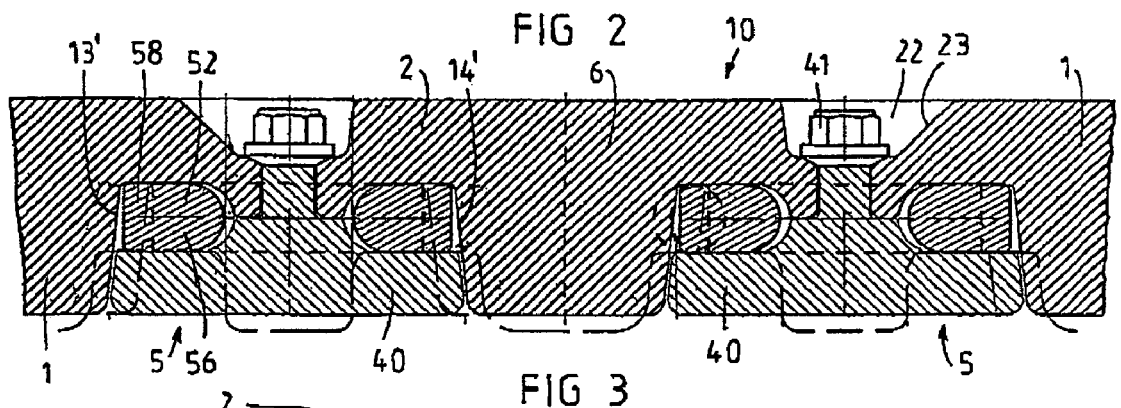
FIG. 3 shows a longitudinal section, partially broken up, through both insertion pockets with inserted and secured horizontal chain links, partially broken up.
Figure 4:
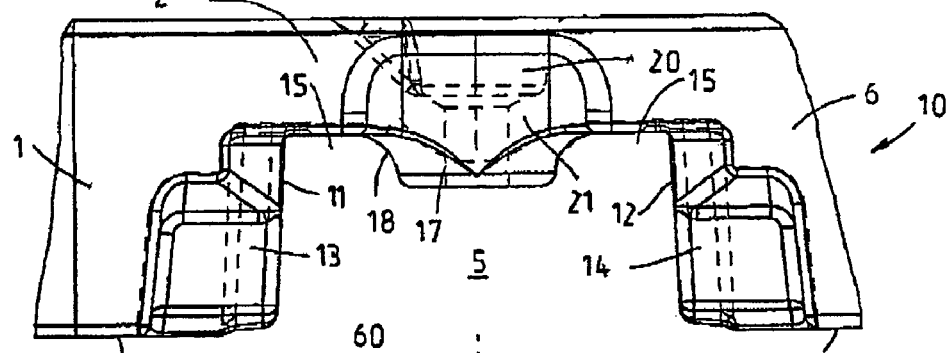
FIG. 4 shows, in an exploded side view, an insertion pocket, two chain links and a scraper-securing element prior to mounting.
Figure 5:
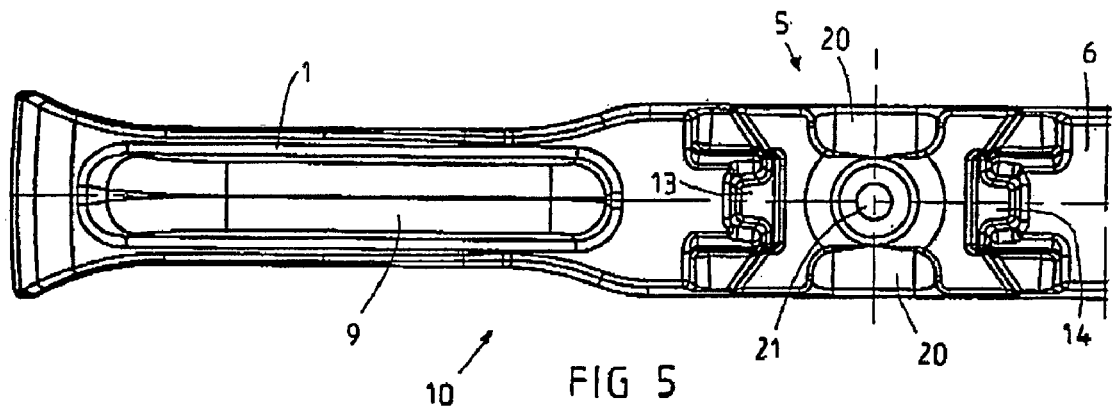
FIG. 5 a view of the underside of a half of a scraper according to the invention.
Figure 7:
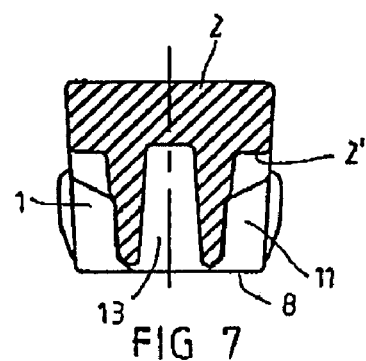
FIG. 7 shows a view along VII-VII in FIG. 6 of a groove in the inside of the scraper wings.

The structure of scrapers 10 embodied for connection to horizontal chain links 52 will now be explained with additional reference to FIG. 2 to 7. Each scraper 10 has at its lateral ends two scraper wings 1 which are integrally connected to one another by means of a head web 2. Scraper 10 according to the invention preferably comprises a cast part and front sides 3 of scraper wings 1, which reach down to underside 8 of scraper 10, have convex recesses 4 in order to improve the conveying capacity of scrapers 1 according to the invention in operational use. The connection of scrapers 10 to horizontal chain links 52 of double center chain 50 is performed into insertion pockets 5 below head web 2. Both insertion pockets 5 lying next to one another are herein divided from one another by means of a solid, in cross-section trapezoidal intermediate web 6 whose underside 7 ends flush with underside 8 of scraper wings 1, as is particularly apparent from FIG. 6. In order to reduce the weight of scrapers 10, both scraper wings 1 are provided with cavities 9 open to underside 8, which cavities 9 are already preferably provided during original shaping of scraper 10. Each scraper wing 1 has, below head web 2, an inside 11 which forms one of both lateral delimitations for insertion pockets 5. The other lateral delimitation of each insertion pocket 5 is formed by respective outsides 12 of central web 6. Insides and outsides 11, 12 diverge slightly, as a result of which the width of insertion pockets 5 increases towards underside 7 or 8. For positive-locking anchoring of horizontal chain links 52 having entrainment projections 58 in insertion pockets 5, grooves 13 and 14 are formed both in insides 11 of scraper wings 1 and in outsides 12 of central web 6, grooves 13 and 14 protruding upwards substantially from underside 8 of scraper 10 to underside 2' of head web 2. Grooves 13 provided according to the invention in insides 11 and grooves 14 in the outsides of intermediate web 6 are particularly apparent from FIGS. 1, 4, 5 and 7. Since grooves 13 and 14 run over the entire height of insertion pockets 5, they extend both across a region in which a scraper-securing element 40 is received in each insertion pocket 5 as well as across the region directly below underside 2' of head web 2 in which limb beds 15 for limbs 56 of horizontal chain links 52 are formed. FIGS. 3 and 4 show herein the status after and before mounting of horizontal chain link 52 and of scraper-securing element 40 in insertion pockets 5. FIG. 3 illustrates that entrainment projections 58 on horizontal limbs 56 extend to groove base 13' or 14' of respective grooves 13, 14 such that the scrapers are therefore fixed in a positive-locking manner in the direction of movement of the link chain on horizontal chain links 52. FIG. 1 shows the positive-locking engagement of entrainment projections 58 with grooves 13 and 14. FIGS. 3 and 4 furthermore illustrate that, between limb beds 15 of each insertion pocket 5, a conical projection 17 protruding downward across web head 2 is formed, which projection 17 has laterally trough-shaped recesses 18 as a part of limb beds 15. The front side of the projection which coincides with front side 19 of head web 2 is provided with trough-shaped bearing zones 20 for chain fronts 65 of vertical chain links 60. Therein, in each case, a bearing zone 20 simultaneously forms a division for both limb beds 15 of an insertion pocket 5 lying next to one another. The relatively flat progression, which is semicircularly cambered across the height of scrapers 10, of the surface of bearing zones 20 on which the fronts of vertical chain links 60 flattened on the outside bear is particularly clearly apparent from FIGS. 2 and 5.

Centrally between both bearing zones 20 which lie opposite one another, each insertion pocket 5 is assigned a screw passage 21 passing perpendicularly through head web 2 which, due to projection 17, reaches relatively far into insertion pocket 5. On upper side 2" of web head 2, each screw passage 21 opens into a recess 22 which serves to receive a fixing nut 41, as FIGS. 1 and 2 in particular show. Herein, an introduction inclination 23 for a detachment tool opens into each recess 22 in order to detach a potentially rusted-tight nut 41 from shaft 43' of a fixing screw 43 which fixes scraper-securing element 40 and horizontal chain link 52 in insertion pocket 5. Fixing screw 43 is embodied as a cap screw, in particular a hammerhead screw, whose head 44 engages in a positive-locking manner with a transverse slot 45 on underside 46 of base 47 of scraper-securing element 40 in a rotationally fixed manner, while shaft 43' of fixing screw 43 passes through a bore in scraper-securing element 40 and through screw passage 21 in head web 2, in order then to be able to screw fixing nut 41 onto shaft 43'.

As is in turn particularly apparent from FIGS. 3 and 4, base 47 of scraper-securing element 40 has, at its upper side, a raised section 48 and, at its transverse sides, in each case a projection 49. Both projections 49 are substantially adapted in terms of cross-section and width to entrainment projections 58 of horizontal chain links 52 and to the groove geometry of grooves 13, 14 so that, in the mounted state, projections 49 can likewise enclose on the transverse sides of scraper-securing element 40 into grooves 13 and 14 on both sides of insertion pockets 5 in order to support inserted horizontal chain link 52 downward over its entire width and prevent tilting movements between horizontal chain link 52 and scraper 10. Raised section 48 cooperates, in the mounted state of scraper 2, chain link 52 and scraper-securing element 40, with projection 17 on the underside of head web 2 and both engage with inner openings 55 of horizontal chain links 52, as FIGS. 2 and 3 in particular illustrate. At the same time, limb beds 30 whose geometry is substantially adjusted to the geometry of limb beds 15 on the underside of head web 2 are formed on the upper side of scraper-securing elements 40 together with trough-shaped recesses on both sides of raised section 48. All limb beds 15 and 30 run out in each case flat to grooves 13, 14 or to projections 49 in order to achieve a good interaction and a large-area bearing with limbs 56 of horizontal chain links 52.

The mounting of scrapers 20 on horizontal chain links 52 of the double center chain is particularly facilitated by the positive-locking fixing of screw heads 44 of fixing screws 43 since a tool for tightening or detaching nuts 41 must be put in place exclusively from above without the fixing screw having to be fixed by a locknut from the underside. Mounting can in particular also be performed with an electrical screwdriver.

Numerous modifications which should fall within the scope of protection of the attached claims are apparent to the person skilled in the art from the above description. An exemplary embodiment is not represented in which only one scraper-securing element is used to secure both horizontal chain links in the insertion pockets. In the case of such an exemplary embodiment, the central web would only reach to the lower height of the limb beds. An exemplary embodiment is also not shown of the use of a scraper having only one insertion pocket on a single center chain.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. These combinations include, but are not limited to, combining a tank with an inner vessel arrangement. Accordingly, it is to be distinctly understood that the foregoing descriptive matter is to be interpreted merely as illustrative of the invention and not as a limitation.

The invention claimed is:

1. A scraper for link chains of scraper chain conveyors, in particular double center scraper chain conveyors, said scraper comprising a scraper body having a head web connecting two lateral scraper wings and at least one insertion pocket between said scraper wings, said pocking being shaped to receive an associated horizontal chain link of an associated link chain and securing said scraper relative to said associated horizontal chain link by means of a detachable scraper-securing element which is connectable to said head web, said wings including insides facing one another and said inside being below said head web, said insides each including a groove, said head web having front sides that include a bearing zone for the fronts of an associated vertical chain links of the associated link chain and on its underside and said head we further including a limb bed on both sides of said bearing zones for limbs of said horizontal chain links and said limb beds having a limb bed height, said grooves extend over at least a portion of said limb bed height up to said head web and forming receivers for associated entrainment projections on the outer faces of the associated limbs of the associated horizontal chain links.

2. The scraper as claimed in claim 1, wherein said scraper body is a one-part scraper body.

3. The scraper as claimed in claim 1, wherein said grooves extend over substantially all of said limb bed height.

4. The scraper as claimed in claim 1, wherein each of said wings has an underside and said grooves extend to said undersides.

5. The scraper as claimed in claim 1, wherein said at least one insertion pocket is at least two insertion pockets including a first pocket and a second pocket separated by an intermediate web extending from said head web and between said scraper wings, said intermediate web including at least one of said grooves and said at least one groove extending over said height of said limb beds up to said head web, said at least one groove forming at least one of said receivers for the associated entrainment projections on the associated horizontal chain links.

6. The scraper as claimed in claim 5, wherein said intermediate web has an underside and said at least one groove extending to said underside.

7. The scraper as claimed in one of claim 5, wherein the associated horizontal chain links have straight front sides on its front sections and recesses with entrainment projections in the outsides of its limbs, said limb beds being shaped to receive the limbs and entrainment projections of the associated horizontal chain links.

8. The scraper as claimed in claim 1, wherein the associated vertical chain links of the associated link has a wire cross-section that is constant around the full circumference and is provided on the outside with a flat section and said bearing zones being shaped to support the associated vertical chain links.

9. The scraper as claimed in claim 1, wherein said limb beds comprise surfaces which run out flat towards said insides.

10. The scraper as claimed in claim 1, wherein said head web further includes a screw passage for receiving a shaft of a fixing screw between said bearing zones.

11. The scraper as claimed in claim 10, wherein said head web further includes a recess for insertion of a nut which cooperates with said fixing screw.

12. The scraper as claimed in claim 11, wherein said head web further includes an introduction inclination for an associated detachment tool and said introduction inclination opening into each of said recess.

13. The scraper as claimed in claim 1, wherein head web further includes a downwardly extending projection between said limb beds and said bearing zones extend over the front sides of said projection.

14. The scraper as claimed in claim 13, wherein said head web further includes a screw passage for receiving a shaft of a fixing screw between said bearing zones, said projection is provided centrally with said screw passage.

15. The scraper as claimed in claim 13, wherein said downwardly extending projection is provided laterally with rounded sections for cooperation with the associated limbs of the associated horizontal chain links.

16. The scraper as claimed in claim 1, wherein said grooves have a trapezoidal cross-section configuration.

17. The scraper as claimed in claim 1, further include a scraper-securing element which can be inserted from below said head web into an insertion pocket, said scraper-securing element having limb beds at their upper side shaped to engage the associated limbs of the associated horizontal chain links, said scraper-securing element further including a projection on its transverse sides shaped top engage said grooves.

18. The scraper as claimed in claim 17, wherein said scraper-securing element further includes a base surface and said base surface having a receiving recess shaped to receive a screw head of a fixing screw for securing said scraper-securing element to said head web.

19. The scraper as claimed in claim 18, wherein said receiving recess forms a positive-locking anti-twist arrangement for said screw head, said recess having a rotationally fixed engagement of said screw head.

20. The scraper claimed in claim 17, wherein said scraper-securing element further includes a raised portion centered between said projections and further includes upwardly extending element limb beds for engaging the associated limbs of the associated horizontal chain links.

21. The scraper as claimed claim 20, wherein said raised portion is provided laterally with rounded portions for cooperation with the associated limbs of the associated horizontal chain links.

22. The scraper as claimed in claim 17, wherein said projection comprises a vertical web with a trapezoidal cross-section configuration.

23. A scraper-securing element for securing a scraper for link chains of scraper chain conveyors, in particular double center scraper chain conveyors, the scraper comprising a scraper body having a head web connecting two lateral scraper wings and at least one insertion pocket between the scraper wings, the pocking being shaped to receive an associated horizontal chain link of an associated link chain and securing the scraper relative to the associated horizontal chain link by means of a detachable scraper-securing element which is connectable to the head web, the wings including insides facing one another and the inside being below the head web, the insides each including a groove, the head web having front sides that include a bearing zone for the fronts of an associated vertical chain links of the associated link chain and on its underside and the head we further including a limb bed on both sides of the bearing zones for limbs of the horizontal chain links and the limb beds having a limb bed height, the grooves extend over at least a portion of the limb bed height up to the head web and forming receivers for associated entrainment projections on the outer faces of the associated limbs of the associated horizontal chain links, said scraper-securing element comprising a scraper-securing body shaped to be insertable in an associated insertion pocket on an associated scraper, said body further including a base which is provided on its transverse sides with projections for engagement with the associated grooves in insides of the associated scraper wings on the associated scraper.

24. The scraper-securing element as claimed in claim 23, wherein said scraper-securing body further includes a base surface and said base surface having a receiving recess for a screw head of a fixing screw for securing said scraper-securing element to an associated head web.

25. The scraper-securing element as claimed in claim 24, wherein said receiving recess forms a positive-locking anti-twist arrangement for said screw head, said recess having a rotationally fixed engagement of said screw head.

26. The scraper-securing element as claimed in claim 23, wherein said scraper-securing element further includes a raised portion centered between said projections and further includes upwardly extending element limb beds for engaging the associated limbs of the associated horizontal chain links.

27. The scraper or scraper-securing element as claimed claim 26, wherein said raised portion is provided laterally with rounded portions for cooperation with the associated limbs of the associated horizontal chain links.

28. The scraper or scraper-securing element as claimed in claim 23, wherein said projections comprises a vertical web with a trapezoidal cross-section configuration.

* * * * *